(12) United States Patent
Halmos

(10) Patent No.: US 6,875,978 B2
(45) Date of Patent: Apr. 5, 2005

(54) MODELOCKED WAVEFORM FOR SYNTHETIC APERTURE LADAR

(75) Inventor: Maurice J. Halmos, Encino, CA (US)

(73) Assignee: Raytheon Company, Waltham, MA (US)

( * ) Notice: Subject to any disclaimer, the term of this patent is extended or adjusted under 35 U.S.C. 154(b) by 14 days.

(21) Appl. No.: 10/099,705

(22) Filed: Mar. 14, 2002

(65) Prior Publication Data

US 2005/0051713 A1 Mar. 10, 2005

Related U.S. Application Data

(63) Continuation-in-part of application No. 09/797,220, filed on Jun. 11, 2001.

(51) Int. Cl.[7] .............................................. G01S 13/00
(52) U.S. Cl. ............................... 250/227.11; 342/25 R; 342/25 D; 342/192; 342/196; 356/5.09
(58) Field of Search .................... 250/227.11; 356/5.09, 356/4.01–5.05; 342/54, 192, 196, 5.09, 25

(56) References Cited

U.S. PATENT DOCUMENTS 3,737,231 A * 6/1973 Low et al. ..................... 372/25
4,339,821 A * 7/1982 Coppock et al. .............. 372/18

(Continued)

FOREIGN PATENT DOCUMENTS

| EP | 0 543 064 A | 5/1993 |
|----|-------------|--------|
| WO | WO 00 59081 | 10/2000 |
| WO | WO 02 054026 A | 7/2002 |

OTHER PUBLICATIONS

Minden et al., A Range–Resolved Doppler Imaging Sensor Based on Fiber Lasers, IEEE Journal of Selected Topics in Quantum Electronics, vol. 3, No. 4, Aug. 1997, pp. 1080–1086.*

Simpson, T.B., et al.: "Frequency Stabilized Mode–Locked Solid–State Laser System . . . ", IEEE Journal of Quantum Electronics, Sep. 1, 1993, v. 29, No. 9, pp. 2489–2496.

*Primary Examiner*—Thanh X. Luu
*Assistant Examiner*—Stephen Yam
(74) *Attorney, Agent, or Firm*—John E. Gunther; Leonard A. Alkov; Karl A. Vick

(57) ABSTRACT

A synthetic aperture ladar system using a mode locked laser transmitter. The inventive system (12) includes a mode locked laser transmitter (22), a receiver (40) adapted to detect signals transmitted by said laser (22) and reflected by an object (32) and a signal processor (50) for analyzing the signals. The laser (22) is particularly novel as a synthetic aperture ladar transmitter inasmuch as it includes a mode locking mechanism (180). The mode locking mechanism (180) causes the laser to output energy at all modes within the gain profile in phase with one another. The result is a series of coherent pulses which may be used for synthetic aperture ladar applications. In a particular embodiment, the present teachings are implemented in a multifunctional laser which, in its operational mode, outputs a mode locked beam for synthetic aperture ladar. In the illustrative embodiment, the laser is an erbium or erbium, ytterbium-doped, fiber pumped laser and the mode locking mechanism is a passive quantum well absorber crystal or an active acoustic crystal mounted in the laser cavity. In any event, the return signals are received and processed to extract range and cross-range imaging information. To this end, the signal processor (50) includes a range de-multiplexer (206) for organizing the return signals into range bins. For each range bin, the signal processor (50) applies a Fast Fourier Transform (210) and centroid detection algorithm (212) to extract a signal representing Doppler frequencies for each range bin. In addition, the signal processor (50) may also extract a signal representing intensity for each range bin.

15 Claims, 6 Drawing Sheets

U.S. PATENT DOCUMENTS

| | | | | |
|---|---|---|---|---|
| 4,516,853 A | * | 5/1985 | Pearson | 356/139.08 |
| 4,687,281 A | * | 8/1987 | Gross | 356/4.09 |
| 4,948,246 A | * | 8/1990 | Shigematsu | 356/5.08 |
| 5,088,808 A | | 2/1992 | O'Meara | |
| 5,278,855 A | | 1/1994 | Jacobovitz-Veselka | |
| 5,418,536 A | | 5/1995 | Lisle | |
| 5,621,514 A | * | 4/1997 | Paranto et al. | 356/5.09 |
| 5,835,199 A | * | 11/1998 | Phillips et al. | 356/3.03 |
| 5,917,843 A | | 6/1999 | Greene | |
| 6,061,170 A | * | 5/2000 | Rice et al. | 359/345 |
| 6,327,282 B2 | * | 12/2001 | Hammons et al. | 372/22 |
| 6,421,573 B1 | * | 7/2002 | Kafka et al. | 700/121 |

* cited by examiner

*PRIOR ART*

MODELOCKED WAVEFORM FOR SYNTHETIC APERTURE LADAR

CROSS-REFERENCE TO RELATED APPLICATIONS

This application is a continuation-in-part of U.S. patent application Ser. No. 09/797,220, entitled MULTI-MODE VIBRATION SENSOR LASER filed Jun. 11, 2001, by M. J. Halmos.

BACKGROUND OF THE INVENTION

1. Field of the Invention

The present invention relates to laser based systems and methods. More specifically, the present invention relates to systems and methods for synthetic aperture ladar.

2. Description of the Related Art

Long range imaging or mapping has become of great interest for both defense and commercial applications. In the defense world, high resolution target imaging allows for target identification at safe ranges beyond weapon capabilities. In defense and also commercial, there is a desire to perform terrain mapping for high resolution topography.

Prior approaches to long range imaging have used radar systems, particularly synthetic aperture radar (SAR). However, the angular resolution achievable with radar is limited by the fact that radar has relatively long wavelengths (compared to optical frequencies).

Ladars have been identified as having unique capabilities for high resolution 3-D imaging. A ladar system often includes a sensor suite mounted on a satellite, missile system, or aircraft. The sensor suite has one or more fixed physical apertures through which a ladar system views a scene. A ladar system views a scene by transmitting a laser through the aperture toward the scene. The laser reflects off the scene, producing a laser return that is detected by the ladar system. Many conventional radar and ladar systems measure the intensity of the return beam and the round trip delay from transmission to detection, which yields the distance (range) to the scene. Laser return intensity and range information may be combined with other image information to facilitate target tracking, terrain mapping, and so on.

In a conventional ladar imaging system, image cross-resolution is limited by the size of the ladar system aperture. Very large and expensive apertures are required to obtain sufficient resolution for many current long-range imaging and mapping applications. This is particularly problematic for ladar systems employed in satellites or missile systems, which have prohibitive space constraints and require long-range viewing capabilities.

To reduce aperture-size requirements, synthetic aperture radar and ladar systems are employed. In a synthetic aperture ladar (SAL) system, additional information about the scene is obtained by changing the viewing angle of the scene. This additional information, called cross-range information, is contained in Doppler frequency shifts detected in the laser return caused by the transmit laser striking various features of the scene at different angles. Cross-range information indicates the relative angular position of certain scene features associated with a given range or distance from the ladar system. The cross-range information is combined with range information to yield an accurate scene profile to enhance the image of the scene.

High resolution applications operating at a range of approximately 100 kilometers, an eye-safe laser wavelength of $1.5 \times 10^{-6}$ m, and a typical cross resolution of 20 cm, require a conventional aperture of approximately 75 cm, which is prohibitively large and expensive for many applications. The large apertures are also undesirably sensitive to thermal and gravitational distortions. An analogous synthetic aperture ladar system on a platform traveling at, for example, 100 m/s would require a measuring time of 7.5 milliseconds (ms) to cover the required 75 cm aperture.

Conventional synthetic aperture ladar systems require that the laser transmitter produce a high-power waveform that is coherent for the entire duration of the measuring time during which the laser return is detected. The high power is often required to reach long ranges of interest. Typically, coherent waveforms longer than a fraction of a millisecond are difficult to achieve, especially at high power levels. In addition to coherence time and high power, the transmitted waveform requires high bandwidth to achieve high downrange resolution, yielding typical bandwidth-time products (BT) greater than 300,000. This implies that the transmitted waveform must be accurate (phase coherent) to 1/300,000 (1/BT). Consequently, conventional synthetic aperture ladar systems have generally been unsuccessful in achieving this bandwidth time product.

Previous synthetic aperture ladar systems could not maintain transmitter coherence for sufficient duration to accurately measure a scene. Accurate synthetic aperture measurements require relatively high beam pulse energy for which coherence is difficult to maintain. Prior attempts at synthetic aperture ladar have tried using the same waveform used in synthetic aperture radar systems, a train of FM chirped waveforms. Each chirp waveform has to be coherent with the next (i.e.—have the same optical phase), but this was impossible with intracavity modulation, and out-of-cavity modulation requires huge sizes and voltages, making the ladars impractical for flight units.

Hence, there is a need in the art for a laser transmitter capable of producing the coherence, high power, and high bandwidth required for use in synthetic aperture ladar applications.

SUMMARY OF THE INVENTION

The need in the art is addressed by the synthetic aperture ladar system of the present invention. The inventive system includes a mode locked laser transmitter; a receiver adapted to detect signals transmitted by said laser and reflected by an object and a signal processor for analyzing the signals.

The laser is particularly novel as a synthetic aperture ladar transmitter inasmuch as it includes a mode locking mechanism. Unlike the single mode laser transmitters that typify the prior art, the mode locking mechanism of the present invention causes the laser to output energy at all modes within the gain profile in phase with one another. The result is a series of coherent pulses which may be used for synthetic aperture ladar applications.

In a particular embodiment, the laser is an erbium or erbium, ytterbium-doped, fiber pumped laser and the mode locking mechanism is a passive quantum well absorber crystal or an active acoustic crystal mounted in the laser cavity. In any event, the return signals are received and processed to extract range and cross-range imaging information. To this end, the signal processor includes a range de-multiplexer for organizing the return signals into range bins. For each range bin, the signal processor applies a Fast Fourier Transform and centroid detection algorithm to extract a signal representing Doppler frequencies for each range bin. In addition, the signal processor may also extract a signal representing intensity for each range bin.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
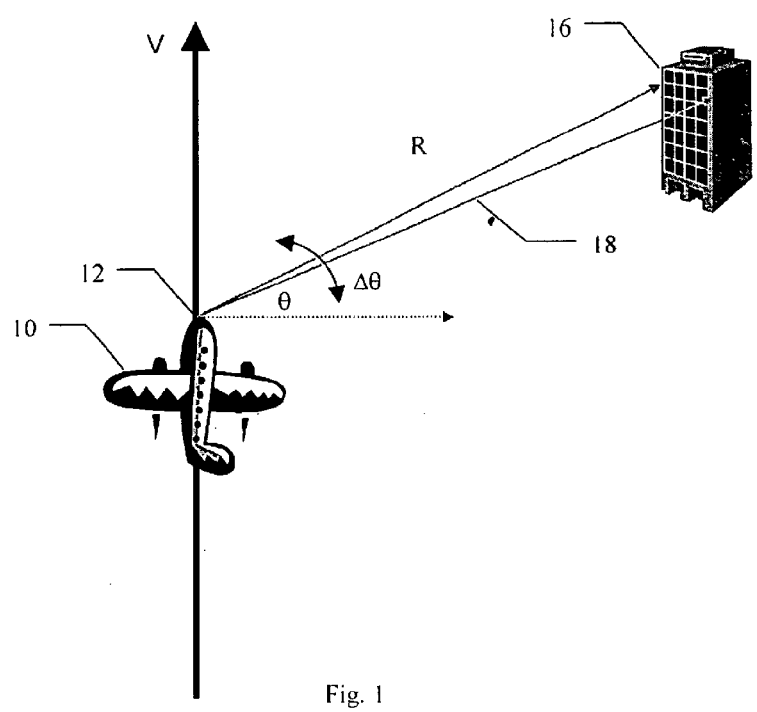
FIG. 1 is an illustration showing the synthetic aperture ladar principle.

FIG. 1 is an illustration showing the synthetic aperture ladar principle. A ladar system 12 mounted on the front of an aircraft 10 flying at a velocity vector V transmits laser pulses 18 to illuminate the features of a building 16. The building 16 is located at a distance R from the ladar system 12 and an angle θ from the normal to the direction of motion. By measuring the time between transmission of a given pulse and the detection of the corresponding laser returns by the ladar system 12, the distance to the building 16 and its various surfaces is determined.

As the aircraft 10 passes over or by the building 16, it fires the laser 18 for a predetermined time, called the dwell time or the measuring time ($T_{meas}$). Throughout the measuring time $T_{meas}$, the angle θ at which the transmitted laser beam 18 strikes and reflects from the building 16 changes (Δθ). As the angle θ changes, each surface of the building 16 yields a return at a slightly different frequency than returns from the other surfaces due to Doppler frequency shifts in the returns from the radial motion of the aircraft 10 relative to the building 16. The Doppler frequency shifts depend on the angle at which the transmitted laser beam 18 strikes the different surfaces of the building 16.

Each return pulse effectively samples the Doppler tones that are present due to the radial motion of the aircraft 10 relative to the building 16. Each return pulse is sampled several times, with each sample being stored in a range bin corresponding to the time at which the sample was taken. The time at which the sample was taken represents the distance or range corresponding to the sample. Over the measuring time $T_{meas}$, several return pulses are sampled by a high-speed A/D converter. The sampled data in N range bins and M pulses is output to Fast Fourier Transform (FFT) modules. The FFT modules extract data from the individual range bins to compute a frequency spectrum associated with each range bin. The frequency spectrum represents cross-range information, which indicates the relative angular position associated with the sampled data from each range bin. Consequently, the angular position associated with each range bin yields range and cross-range information for each surface of the building 16. This range and cross-range information may then be plotted to yield an accurate profile of the building 16 in the direction of travel V of the aircraft 12.

The measuring time ($T_{meas}$) multiplied by the velocity (V) of the aircraft is proportional to the synthetic aperture, which is inversely proportional to the cross-range resolution of the ladar system 12. Generally, the Doppler frequency shift (Doppler velocity) ($f_d$) associated with a return due the motion of the aircraft 10 relative to the building 16 for a small angle θ is given by the following equation:

$$f_d = \frac{2V}{\lambda} \cdot \sin(\theta) \cong \frac{2V}{\lambda} \cdot \theta. \qquad [1]$$

where λ is the wavelength of the transmitted laser beam 18, and V is the velocity of the aircraft 10.

The angle θ corresponding to the Doppler shift $f_d$ is given by the following equation, which is obtained by rearranging equation (1):

$$\theta = \frac{\lambda f_d}{2V} \Rightarrow \delta\theta = \frac{\lambda \cdot \delta f_d}{2V}. \quad [2]$$

where $\delta\theta$ is a small change in angle $\theta$ and represents the cross-range resolution, while $\delta f_d$ is a corresponding small change in the Doppler shift $f_d$ and corresponds to the accuracy with which the Doppler $f_d$ shift can be measured.

The best frequency resolution $\delta f_d$ which can be measured is obtained from Fourier theory to be:

$$\delta f_d \approx \frac{1}{T_{meas}}. \quad [3]$$

where $T_{meas}$ is the measuring time or dwell window during which scene measurements are performed by the ladar system 12.

The cross-range resolution $\delta\theta$ is given by the following equation:

$$\delta\theta = \frac{\lambda}{2V \cdot T_{meas}} = \frac{\lambda}{2 \cdot D_{synth}}. \quad [4]$$

where $D_{synth}$ is the effective aperture size given by $D_{synth} = 2*V*T_{meas}$.

Using the synthetic approach, one could use a relatively small aperture, and have the measuring time, $T_{meas}$, long enough such that twice the aircraft velocity times the measuring time ($2*V*T_{meas}$) is equal to the desired aperture for the desired cross-range resolution. The measuring time $T_{meas}$ is the coherence time required of the waveform. Anticipating integration times of 1–10 ms and bandwidth of 1 GHZ, the time-bandwidth product would be approximately $1-10 \times 10^6$. The only hope of achieving such a waveform is to use a natural waveform of the laser.

Laser transmitters have a natural waveform that can be used, such as the mode locked operation, which contains both the coherence and high bandwidth that is required for synthetic aperture ladar applications. Conventional coherent laser transmitters operate in a single mode. Laser cavities, however, naturally resonate at multiple tones. Single mode laser transmitters generally employ a mode selection element, Etalon, or are seeded to isolate a single mode and suppress the other modes under the gain line. This is difficult and adds significantly to the cost and complexity of the system. The mode locked waveform, on the other hand, allows all modes to resonate. It includes an intra-cavity device to excite the modes so that the modes line up in phase, resulting in a train of coherent pulselets. The mode locked waveform hasn't been suggested in the past for synthetic aperture ladar because people do not think of it as a coherent waveform due to the small pulselets that constitute it. The following describes how this waveform will work well for synthetic aperture ladar.

In the above-identified parent application (U.S. patent application Ser. No. 09/797,220, entitled MULTI-MODE VIBRATION SENSOR LASER filed Mar. 01, 2001, by M. J. Halmos), a novel system and method for remotely detecting vibration using a mode locked laser is disclosed. A similar approach can be used for synthetic aperture ladar systems.

Figure 2:
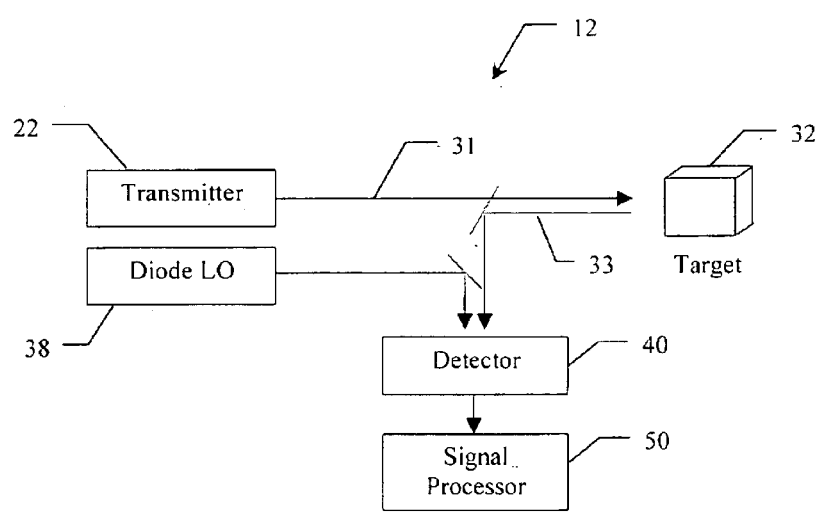
FIG. 2 is a block diagram of the basic configuration of a synthetic aperture ladar system implemented in accordance with the present teachings.

FIG. 2 is a block diagram of the basic configuration of a synthetic aperture ladar system implemented in accordance with the present teachings. The system 12 includes a mode locked transmitter 22 implemented in accordance with the present teachings. The mode locked output 31 from the laser transmitter 22 is reflected off a target 32. The return signal 33 is mixed with a local oscillator 38 by a receiver detector 40. The resulting signal is then processed by a signal processor 50. As discussed more fully below, the transmitter 22 outputs a unique mode locked output signal particularly well-suited for synthetic aperture ladar. The transmitter is shown in detail in FIG. 3a.

Figure 3A:
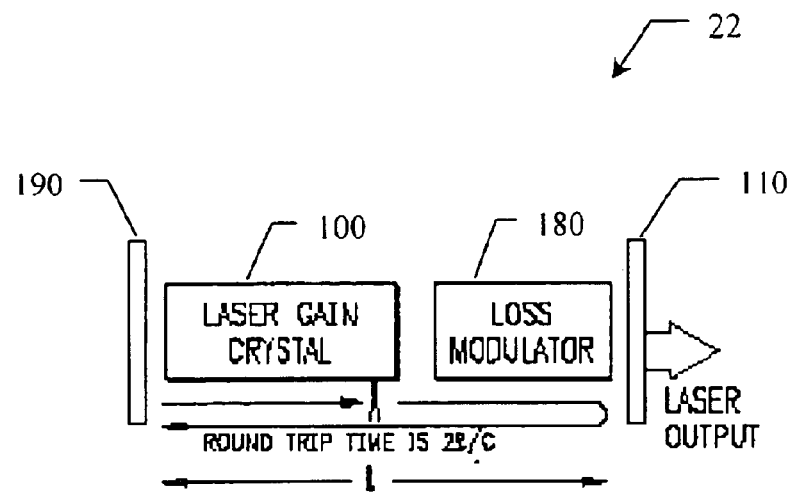
FIG. 3a is a block diagram of the laser transmitter of the illustrative embodiment configured to provide a mode locked output.

FIG. 3a is a block diagram of the laser transmitter 22 of the illustrative embodiment configured to provide a mode locked output. The transmitter 22 includes a gain medium 100 and a mode locking element such as a loss modulator 180 disposed in an optical cavity provided by a partially reflective output coupler 110 and a high reflectivity mirror 190. In the illustrative embodiment, the gain medium 100 is an erbium or erbium, ytterbium-doped, crystal pumped via optical fibers (not shown).

The output coupler 110 and the high-reflector 190 provide a resonant cavity in which there are multiple resonant modes or frequencies. The frequencies are uniformly spaced at c/2, where 'c' is the speed of light and 'l' is the length of the cavity. These modes are called Fabry-Perot laser modes and are depicted in FIG. 3b.

Figure 3B:
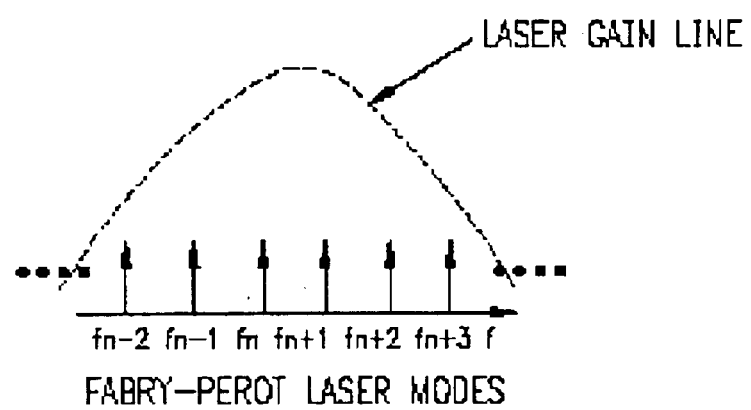
FIG. 3b is a diagram that illustrates the modes that exist within a laser cavity.

FIG. 3b is a diagram that illustrates the modes that exist within a laser cavity. With a gain medium inside the cavity, there will be a region in which there is optimal gain, each resonant mode under the gain line can lase. Energy at the laser modes within the gain profile lases and will be output by the outcoupler 110.

Figure 3C:
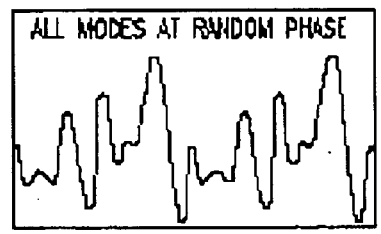
FIG. 3c is a diagram that illustrates the output of a typical laser without a mode locking element with modes at random phase.

The addition of a loss modulator 180 to the cavity has the effect of lining up the modes such that the modes are in phase. Without a mode locking element 180, laser modes would be output in random phases as depicted in FIG. 3c. FIG. 3c is a diagram that illustrates the output of a typical laser without a mode locking element with modes at random phase.

Figure 3D:
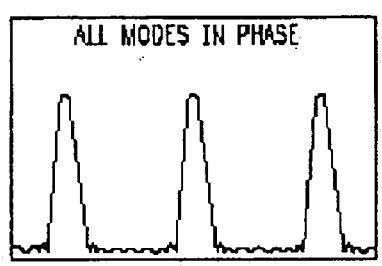
FIG. 3d is a diagram which illustrates the output of a mode locked laser with modes in phase.

FIG. 3d is a diagram which illustrates the output of a mode locked laser with modes in phase. Note that in FIG. 3d, with the modes in phase, the sine peaks line up, producing narrow pulses.

The loss modulator 180 excites all the modes under the gain line of the laser and keeps them in phase. The laser is said to be 'mode-locked' in that the modes under the gain line exist and are lined up in phase. This contrasts with the conventional single mode laser transmitter typically used for ladar systems. Single mode laser transmitters generally employ a mode selection element, Etalon, or seeded mode to isolate a single mode and suppress the other modes under the gain line. This is depicted in FIG. 3e.

Figure 3E:
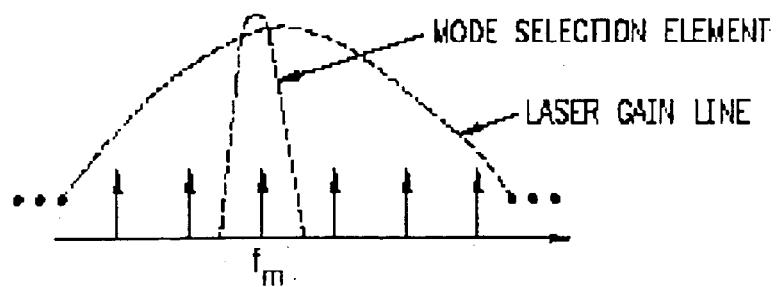
FIG. 3e is a diagram of the modes in a laser cavity having a mode selection element therein.

FIG. 3e is a diagram of the modes in a laser cavity having a mode selection element therein. Unfortunately, as mentioned above, the isolation of a single mode and the suppression of the other modes in a cavity is difficult and adds significantly to the cost and complexity of the system.

However, as illustrated in FIG. 3a, in accordance with the present teachings, instead of isolating a single mode and suppressing the other modes in the cavity, the mode locking element 180 is added to excite the modes so that the modes line up in phase. The mode locking element or loss modulator 180 can be: 1) a passive mode locker, i.e., a crystal that is normally opaque to light (does not let the light through) until it reaches a certain intensity threshold (e.g., a passive multiple quantum well absorber crystal such as gallium arsenide) or 2) an active mode-locker with an acoustic crystal.

Figure 3F:
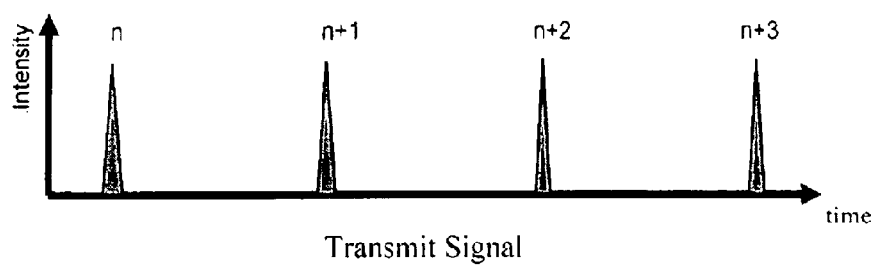
FIG. 3f is an illustration of a mode locked pulse train output from the transmitter of the illustrative embodiment.

The output of the mode locked laser transmitter 22 is thus a train of mode locked pulses. FIG. 3f is an illustration of a mode locked pulse train output from the transmitter 22 of the illustrative embodiment. The mode locked train of pulses yields as good coherence time as a single mode laser would, but in addition it contains the high bandwidth (greater than 500 MHz) that is also required. A mode locked laser transmitter can therefore be used successfully in a synthetic aperture ladar system such as that shown in FIG. 2.

The synthetic aperture ladar method of the present invention is best illustrated with reference to FIGS. 3f–3h.

FIG. 3f shows the mode locked pulse train, which is transmitted by the transmitter 22 in the ladar system 12. In the figure, four pulses [n, (n+1), (n+2), and (n+3)] are shown. The transmitted signal 31 is reflected by the surfaces of the target 32 and received by the receiver detector 40.

Figure 3G:
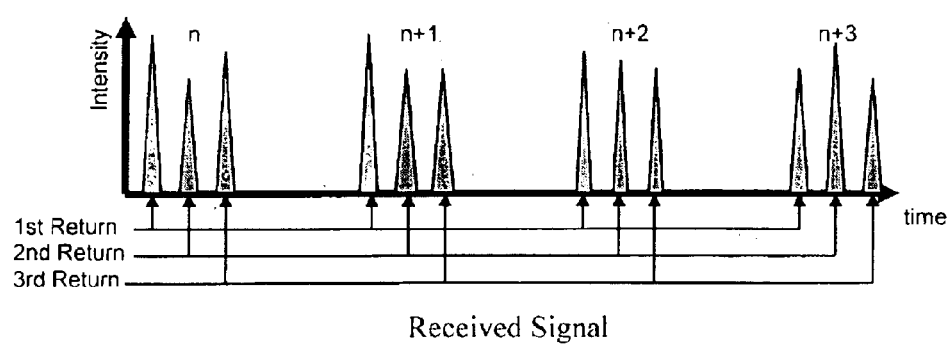
FIG. 3g is a diagram illustrating the returns from the pulses generated by the transmitter of the present invention.

FIG. 3g is a diagram illustrating the returns from the pulses generated by the transmitter of the present invention. Shown, as an example, is a return from a target 32 with three separate surfaces at different ranges and possibly angular (cross-range) location. Each pulse [n, (n+1), (n+2), and (n+3)] of the transmitted pulse train 31 yields, a short time later, a corresponding set of three returns in the received pulse train 33, one return for each surface reflected by the target 32. For illustrative purposes, the return pulse train 33 has three distinct returns for each transmitted pulse of the pulse train. In practice, each set of three returns in the pulse train are typically closer together and may blend into a single return pulse, with different peaks, each peak corresponding to a surface of the target 32.

The receiver detector 40 mixes the laser return 33 with a local oscillator 38 reference beam and outputs a cross-product of the laser return and local oscillator optical fields. The desired information about a scene is contained in the portion of the detector's output that oscillates at the frequency difference between the local oscillator reference beam and the laser return. This output can be narrow-band filtered to eliminate noise in frequency regions outside predicted signal locations. This noise filtering is enabled by the preservation of the spectrum information pertaining of the transmit laser by an optical heterodyne or homodyne detection process.

The reference beam output by the local oscillator 38 is coherent throughout the measuring time $T_{meas}$. The local oscillator 38 may be implemented with a standard laser usually of the same base material as the transmitter, such as Er:Yb:Glass or Er:YAG in the current embodiment. As is known in the art, the coherence of the local oscillator 38, which is relatively low-power and runs in CW mode, is easier to maintain than a high energy pulsed transmit laser, such as the mode locked laser transmitter 22. The local oscillator 38 may be set to any mode within the gain line of the transmitter 22. The exact location of the local oscillator is not important because the transmitter modes repeat themselves.

Figure 3H:
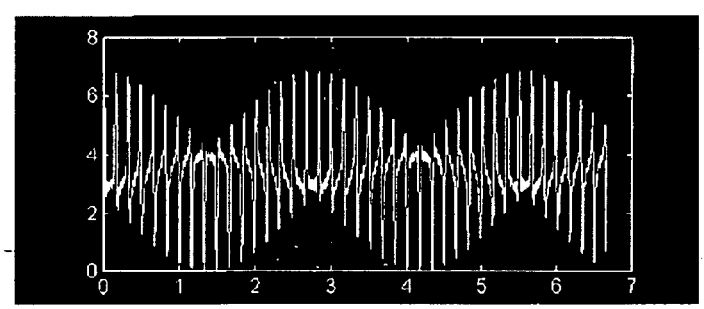
FIG. 3h is a diagram illustrating the cross-product of the laser return and local oscillator output by the receiver detector of the present invention.

FIG. 3h is a diagram illustrating the cross-product of the laser return and local oscillator output by the receiver detector 40 of the present invention. The pulsing coherent waveform effectively samples the slower Doppler beat tone. By sampling at the pulselet repetition rate c/2l, the pulse train corresponding to each return can be extracted and placed into separate range bins.

The signal processor 50 separates the returns into range bins. The intensity at the range-bins is treated as if it was a sampled signal (below Nyquist rate) and an FFT is performed to obtain the frequency at the corresponding range bin. Once the Doppler frequencies are obtained, the signal processing is identical to any standard synthetic aperture processing system.

Figure 4:
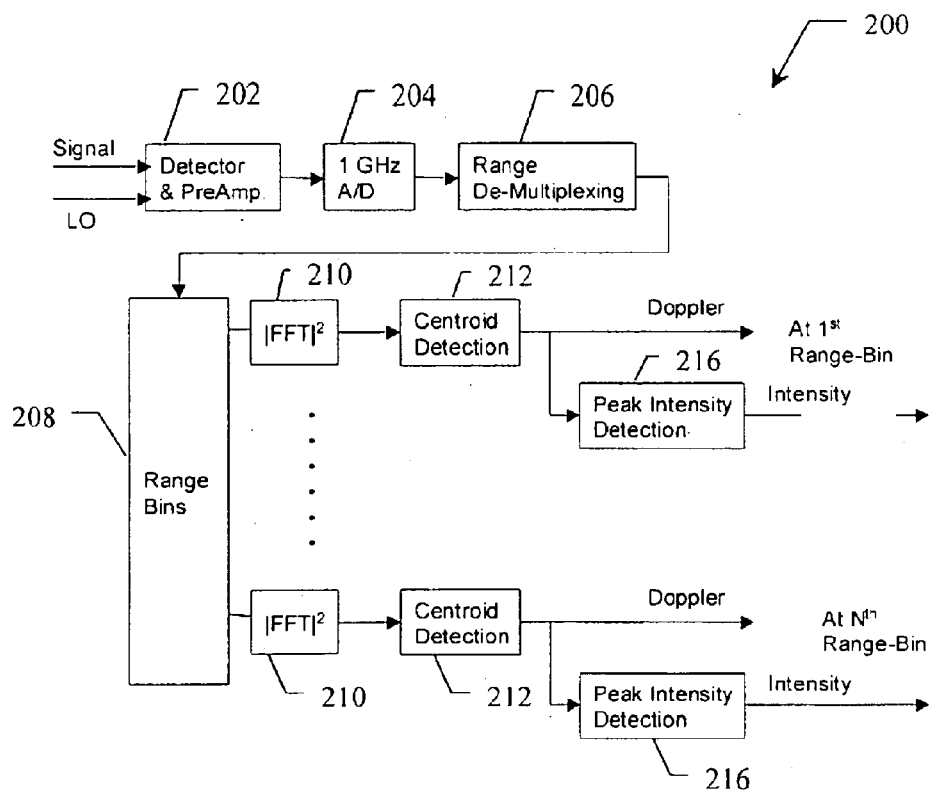
FIG. 4 is a block diagram of the signal processing method of the present invention.

FIG. 4 is a block diagram of the signal processing method of the present invention. As shown in FIG. 4, the method 200 begins with the detection and pre-amplification of the received signal in hardware at step 202. At step 204, the detected and amplified signal is digitized. At steps 206 and 208, the digitized return signals are separated into range bins. For each range bin, of which N are shown, at step 210, a Fast Fourier transform is performed on the digitized signal. The FFT extracts data from the individual range bins to compute a frequency spectrum associated with each range bin. Next, at step 212, the centroids of the transformed signal that are above a predetermined detection threshold are detected, yielding center frequencies. The center frequencies represent cross-range information in the form of Doppler frequencies. Each range bin can have one or more, or zero, centroids. At step 216, the peak intensity can also be detected and output. This yields a more realistic effect of the target terrain being topographed. Methods and algorithms for performing Fast Fourier Transforms, centroid detection and peak detection are well known to those of ordinary skill in the art.

Figure 5:
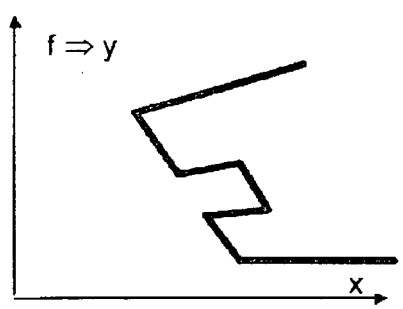
FIG. 5 is an example frequency vs. range plot that corresponds to range vs. cross-range which is the topographical cross section of the target area.

Once the Fourier centroids are obtained, a plot of the range vs. frequency can be generated. Each range bin corresponds to the time at which the sample was taken. The time at which the sample was taken represents the distance or range corresponding to the sample. The centroid frequencies represent cross-range information, which indicate the relative angular position associated with the sampled data from each range bin. Consequently, the angular position associated with each range bin yields range and cross-range information for each surface of the target 32. This range and cross-range information may then be plotted to yield an accurate profile of the target 32 in the direction of travel of the aircraft as shown in FIG. 5. FIG. 5, is an example frequency vs. range plot that corresponds to range vs. cross-range which is the topographical cross section of the target area.

Figure 6:
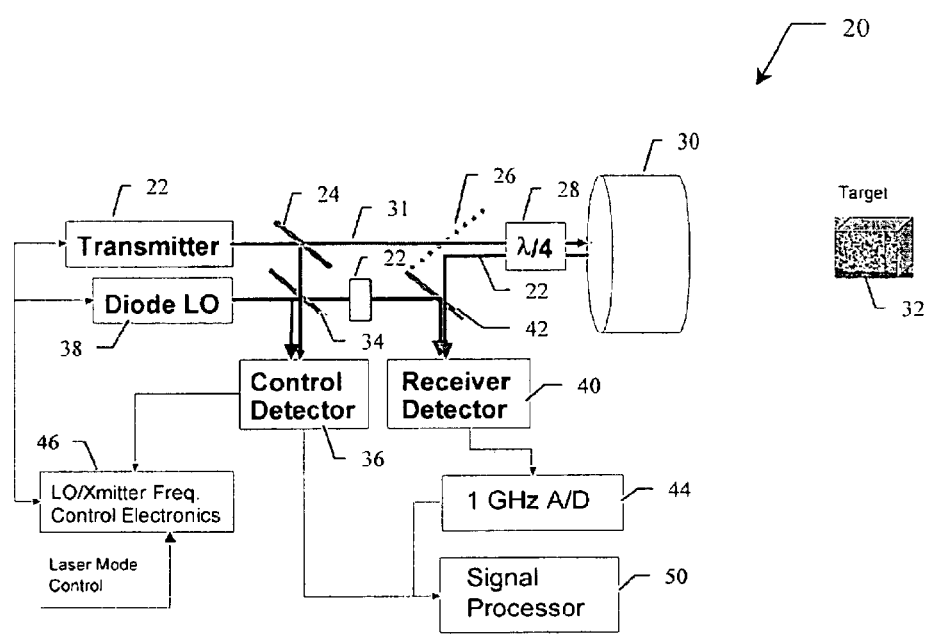
FIG. 6 is a diagram of an illustrative embodiment of the synthetic aperture ladar system of the present invention.

FIG. 6 is a diagram of an illustrative embodiment of the synthetic aperture ladar system of the present invention. The system 20 includes a mode locked transmitter 22 implemented in accordance with the present teachings. The output of the transmitter 22 passes through a first polarizer 24, a polarizing beamsplitter 26, a one-quarter wave plate 28 and a telescope 30 to a target 32. Pulses of energy reflected off the target 32 are collected by the telescope 30 and focused on the quarter-wave plate 28. The result of two passes through the quarter-wave plate is to induce a 90° rotation in the horizontal polarization of the output beam 31 with respect to the return signal 33. The vertically polarized component of the output beam 31 is directed to a control detector 36 via the first polarizer 24 and a second polarizer 34. The second polarizer 34 also serves to direct the vertically polarized output of a local oscillator diode laser 38 to the control detector 36. In accordance with the present teachings, the local oscillator 38 may be set to any mode within the gain line of the transmitter 22. The horizontally polarized output of the local oscillator 38 is rotated by a 90° rotator 53 and then is reflected by a third polarizer 42 to a receiver detector 40. The receiver detector 40 also receives the return beam 33 via the third polarizer 42.

The control detector 36 and the receiver detector 40 may be implemented with diode detectors. The control detector 36 and receiver detector 40 allow for a differential detection of the received signal relative to the transmitted signal 31. The output of the receiver detector 40 is digitized by an analog-to-digital converter 44 and input to a signal processor 50 along with the output of the control detector 36. The speed of the analog to digital converter is selected to match the pulse width of the return pulse. The signal processor 50 may be a microprocessor which implements a synthetic aperture ladar algorithm in software appropriate for the output mode of the laser as discussed above.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

Accordingly,

What is claimed is:

1. A synthetic aperture ladar system comprising:
   a mode locked laser transmitter;
   a receiver adapted to detect signals transmitted by the laser and reflected by an object;
   means for moving the laser transmitter and receiver, wherein the direction of motion forms a large angle with the direction of the transmitted laser beam; and
   means for processing the detected signals to increase cross-range resolution.

2. The invention of claim 1 wherein the laser transmitter includes a laser and means for mode locking the output thereof.

3. The invention of claim 2 wherein the laser is an erbium-doped crystal laser.

4. The invention of claim 3 wherein the laser is an erbium, ytterbium-doped laser.

5. The invention of claim 3 further including means for pumping the laser via an optical fiber.

6. The invention of claim 2 wherein the means for mode locking includes a quantum well absorber.

7. The invention of claim 2 wherein the means for mode locking includes an acoustic crystal.

8. The invention of claim 1 wherein the means for processing includes a range de-multiplexer for organizing the signals into range bins.

9. The invention of claim 8 wherein the means for processing further includes means for extracting a signal representing Doppler frequencies detected for each range bin.

10. The invention of claim 9 wherein said means for extracting Doppler frequencies includes means for computing a frequency spectrum associated with each range bin.

11. The invention of claim 10 wherein said means for computing a frequency spectrum includes a Fast Fourier Transform.

12. The invention of claim 10 wherein said means for extracting Doppler frequencies further includes means for detecting centroids of said frequency spectrums.

13. The invention of claim 9 wherein the means for processing further includes means for extracting a signal representing intensity of the signal detected for each range bin.

14. The invention of claim 1 further including a local oscillator for generating a reference beam.

15. The invention of claim 14 wherein said receiver combines said reflected signal with said reference beam.

* * * * *